(12) United States Patent
Kazama et al.

(10) Patent No.: US 9,179,504 B2
(45) Date of Patent: Nov. 3, 2015

(54) ELECTRIC POWER CONVERTING APPARATUS AND INDUCTION HEATING APPARATUS

(75) Inventors: Shun Kazama, Osaka (JP); Masaki Tagome, Osaka (JP); Makoto Kitabatake, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 893 days.

(21) Appl. No.: 13/062,302

(22) PCT Filed: Jul. 30, 2010

(86) PCT No.: PCT/JP2010/004853
§ 371 (c)(1),
(2), (4) Date: Mar. 4, 2011

(87) PCT Pub. No.: WO2011/016214
PCT Pub. Date: Feb. 10, 2011

(65) Prior Publication Data
US 2011/0168697 A1    Jul. 14, 2011

(30) Foreign Application Priority Data
Aug. 4, 2009  (JP) .................................. 2009-181534

(51) Int. Cl.
*H05B 6/04*    (2006.01)
*H05B 6/06*    (2006.01)
*H02M 1/14*   (2006.01)

(52) U.S. Cl.
CPC .................. *H05B 6/062* (2013.01); *H05B 6/04* (2013.01); *H02M 1/14* (2013.01)

(58) Field of Classification Search
CPC ....... H05B 6/04; H02M 5/458; H02M 5/4585
USPC ......... 363/132, 136, 137, 138, 34, 95, 96, 41, 363/37, 98; 219/600, 660; 361/85, 86; 318/807, 829, 729, 254
See application file for complete search history.

(56) References Cited

U.S. PATENT DOCUMENTS 4,730,242 A  *  3/1988  Divan .............................. 363/37
5,111,374 A  *  5/1992  Lai et al. ......................... 363/37
(Continued)

FOREIGN PATENT DOCUMENTS

CN    1463486    12/2003
EP    1 978 628   10/2008
(Continued)

OTHER PUBLICATIONS

International Search Report issued Oct. 19, 2010 in International (PCT) Application No. PCT/JP2010/004853.
(Continued)

*Primary Examiner* — Tu B Hoang
*Assistant Examiner* — Phuong Nguyen
(74) *Attorney, Agent, or Firm* — Wenderoth, Lind & Ponack, L.L.P.

(57) ABSTRACT

To aim to reduce ripple current flowing through a capacitor in a power converter apparatus including a converter, the capacitor and an inverter. A current sensor 6 is connected between a capacitor 5 and an inverter circuit 7 for detecting current Iinv flowing from the capacitor 5 to the inverter circuit 7. A frequency detecting subunit 11 performs fast Fourier transform on a waveform of the current Iinv to detect a frequency of a frequency component having the largest amplitude. Also, the frequency detecting subunit 12 detects a zero-cross point of the frequency component having the largest amplitude. Then a carrier signal control subunit 13 performs control such that a frequency and a rise time of a PWM carrier signal for driving the converter circuit 4 match the frequency and the zero-cross point that have been detected by the frequency detecting subunit 11 and the phase detecting subunit 12.

5 Claims, 12 Drawing Sheets

(56) References Cited

U.S. PATENT DOCUMENTS

| | | | |
|---|---|---|---|
| 5,206,575 A * | 4/1993 | Nakamura et al. | 318/807 |
| 5,504,667 A | 4/1996 | Tanaka et al. | |
| 7,471,525 B2 | 12/2008 | Suzuki et al. | |
| 2003/0164691 A1 | 9/2003 | Ueda et al. | |
| 2004/0008005 A1* | 1/2004 | Sakai et al. | 318/801 |
| 2004/0085785 A1* | 5/2004 | Taimela | 363/37 |
| 2005/0174076 A1* | 8/2005 | Katanaya | 318/254 |
| 2006/0067655 A1 | 3/2006 | Okuda et al. | |

FOREIGN PATENT DOCUMENTS

| | | |
|---|---|---|
| JP | 4-121065 | 4/1992 |
| JP | 7-79567 | 3/1995 |
| JP | 10-80150 | 3/1998 |
| JP | 2003-102177 | 4/2003 |
| JP | 2004-187468 | 7/2004 |
| JP | 2006-67754 | 3/2006 |
| JP | 2006-101675 | 4/2006 |
| JP | 2007-124827 | 5/2007 |
| JP | 2008-259343 | 10/2008 |
| JP | 2009-17662 | 1/2009 |
| WO | 88/02573 | 4/1988 |

OTHER PUBLICATIONS

Chinese Office Action (OA) issued Feb. 26, 2013 in Chinese Patent Application No. 201080002772.9.

* cited by examiner

FIG. 6

| Frequency of resonant current | Converter carrier frequency |
|---|---|
| 90 kHz | 180 kHz |
| 23 kHz | 46 kHz |

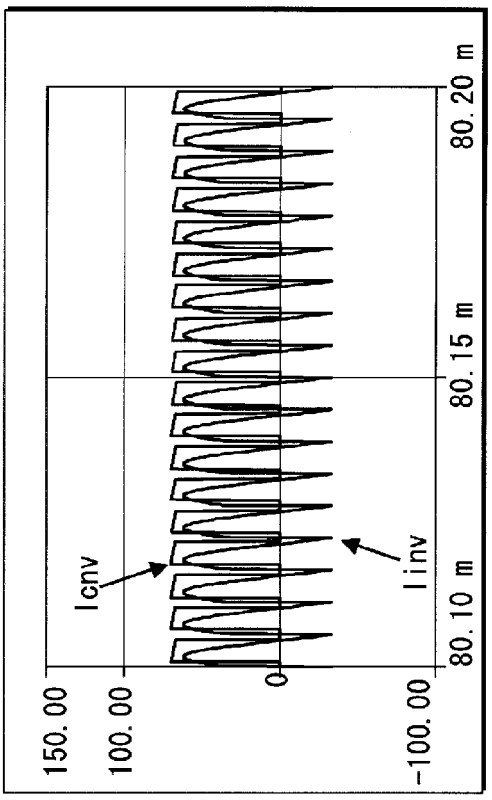
FIG. 8A
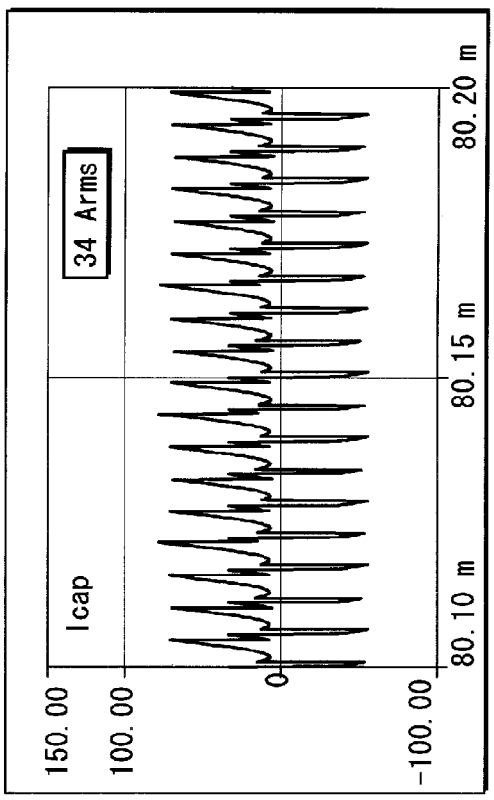
FIG. 8B
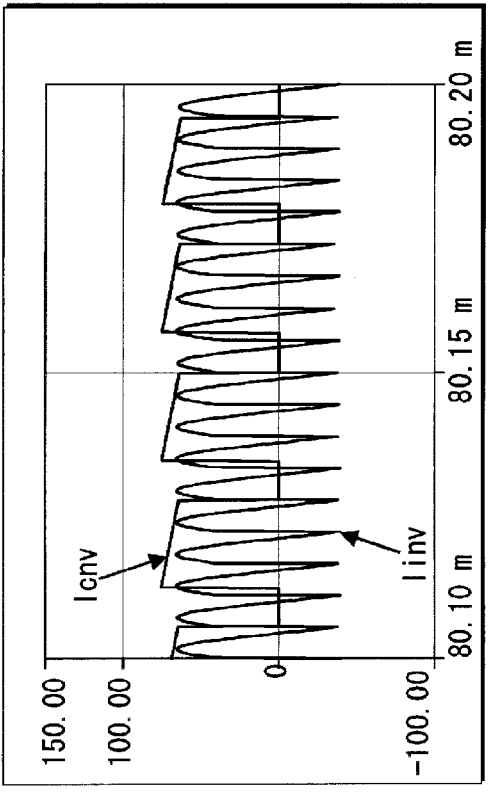
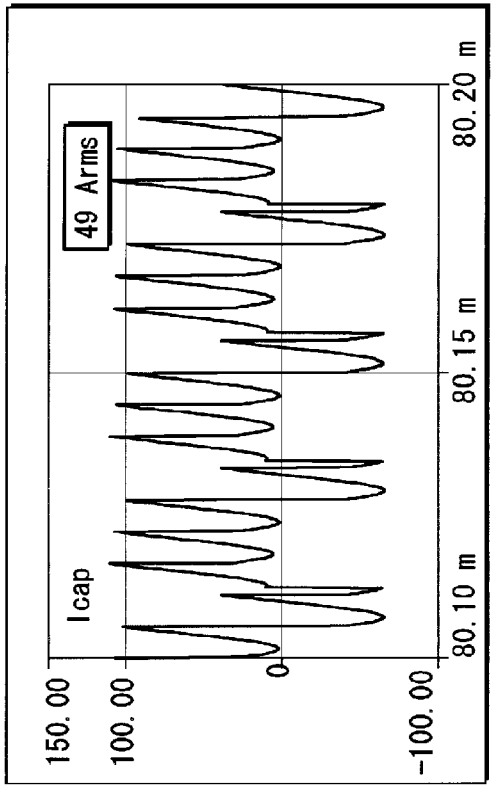

ELECTRIC POWER CONVERTING APPARATUS AND INDUCTION HEATING APPARATUS

TECHNICAL FIELD

The present invention relates to a technology used in an electric power converting apparatus composed of a converter, a capacitor and an inverter, for reducing ripple current flowing through the capacitor.

BACKGROUND ART

An electric power converting apparatus is composed of a converter, a capacitor and an inverter, and supplies electric power to a load such as a motor.

The converter is connected to a power source, and transforms power voltage. When the power source is a system power supply, an AC-DC converter is used. When the power source is a high voltage battery, a DC-DC converter is used. The inverter converts direct current to alternating current, and supplies electric power to a load. The capacitor is connected between the converter and the inverter, and smoothes voltage to be input into the inverter. Generally, an electrolytic capacitor that is suitable for downsizing and cost reductions is used as the capacitor.

In the electric power converting apparatus, direct current flowing from the converter to the capacitor and direct current flowing from the capacitor to the inverter influence each other and accordingly current flowing through the capacitor (hereinafter, referred to as "ripple current") grows large. When the ripple current is large, the life of the electrolytic capacitor is decreased due to heat generation by an equivalent series resistance. Therefore, the heat generation is reduced by increasing capacity of the capacitor, and this unfortunately impedes downsizing of the electric power converting apparatus.

Patent Literature 1 discloses an invention for detecting ripple current flowing through a capacitor using a resistance connected in series to the capacitor, and reducing an average value of ripple current. However, though the technology disclosed in the Patent Literature 1 is capable of reducing the ripple current on average, reduction of pulsing charging/discharging current is not considered.

In view of this, Patent Literature 2 discloses an invention for reducing pulsing charging/discharging current flowing through a capacitor by setting a frequency of a carrier signal for driving a converter to be twice as high as a frequency of a carrier signal for driving an inverter.

CITATION LIST

Patent Literature

[Patent Literature 1]
Japanese Patent Application Publication No. 2006-67754
[Patent Literature 2]
Japanese Patent Application Publication No. 2008-259343

SUMMARY OF INVENTION

Technical Problem

However, even when a frequency of a carrier signal of a converter matches with or is set to be twice as high as a frequency of a carrier signal of an inverter, a frequency and a phase of current flowing from the converter to a capacitor does not correctly match a frequency and a phase of current flowing from the capacitor to the inverter. This is due to delay of switching, dispersion of elements in accordance with arrangement, or parasitic components unique to an apparatus. Therefore, even when the technology disclosed in Patent Literature 2 is used, ripple current is not necessarily reduced as expected.

The present invention has been achieved in view of the above problems, and aims to provide an electric power converting apparatus and an induction heating apparatus that are capable of reducing ripple current more reliably than the conventional apparatuses.

Solution to Problem

In order to achieve the above aim, an electric power converting apparatus of the present invention comprises: a converter circuit that transforms power-supply voltage by a pulse width modulation method; a capacitor that smoothes voltage output by the converter circuit; an inverter circuit that converts direct-current voltage smoothed by the capacitor into alternating-current voltage and supplies electric power to a load; a current sensor that detects current flowing from the capacitor to the inverter circuit; and a control unit operable to acquire a frequency and a phase of frequency component having a maximum amplitude among frequency components of the current flowing from the capacitor to the inverter circuit based on the current detected by the current sensor, and match a frequency and a phase of a pulse width modulation carrier signal for driving the converter circuit with the acquired frequency and phase.

Advantageous Effects of Invention

According to the structure described above, a frequency and a phase of a pulse width modulation carrier signal are respectively matched with a frequency and a phase of a frequency component having the maximum amplitude among frequency components of current flowing from the capacitor to the inverter circuit, based on an actual value measured by the current sensor. Accordingly, compared with the conventional technology in which a converter carrier frequency is matched with an inverter carrier frequency, accuracy of synchronization is improved between current flowing from the converter circuit to the capacitor and current flowing from the capacitor to the inverter circuit. Therefore, it is possible to reduce ripple current flowing through the capacitor more reliably than the conventional technology.

When ripple current is reduced, it is possible to reduce an amount of heat generation of the capacitor, then extend the life of the capacitor, and downsize of the capacitor and the apparatus per se. Also, the downsizing of the capacitor can reduce cost and increase freedom in arrangement.

Furthermore, the reduction of the ripple current can reduce power noise.

BRIEF DESCRIPTION OF DRAWINGS

FIG. 6 shows a data structure of a table 70 held by a frequency detecting subunit 11b.

FIGS. 8A and 8B show examples of simulation results of the induction heating apparatus 100b.

DESCRIPTION OF EMBODIMENTS

Embodiments of the present invention are described below with reference to the drawings.

Embodiment 1

Figure 1:
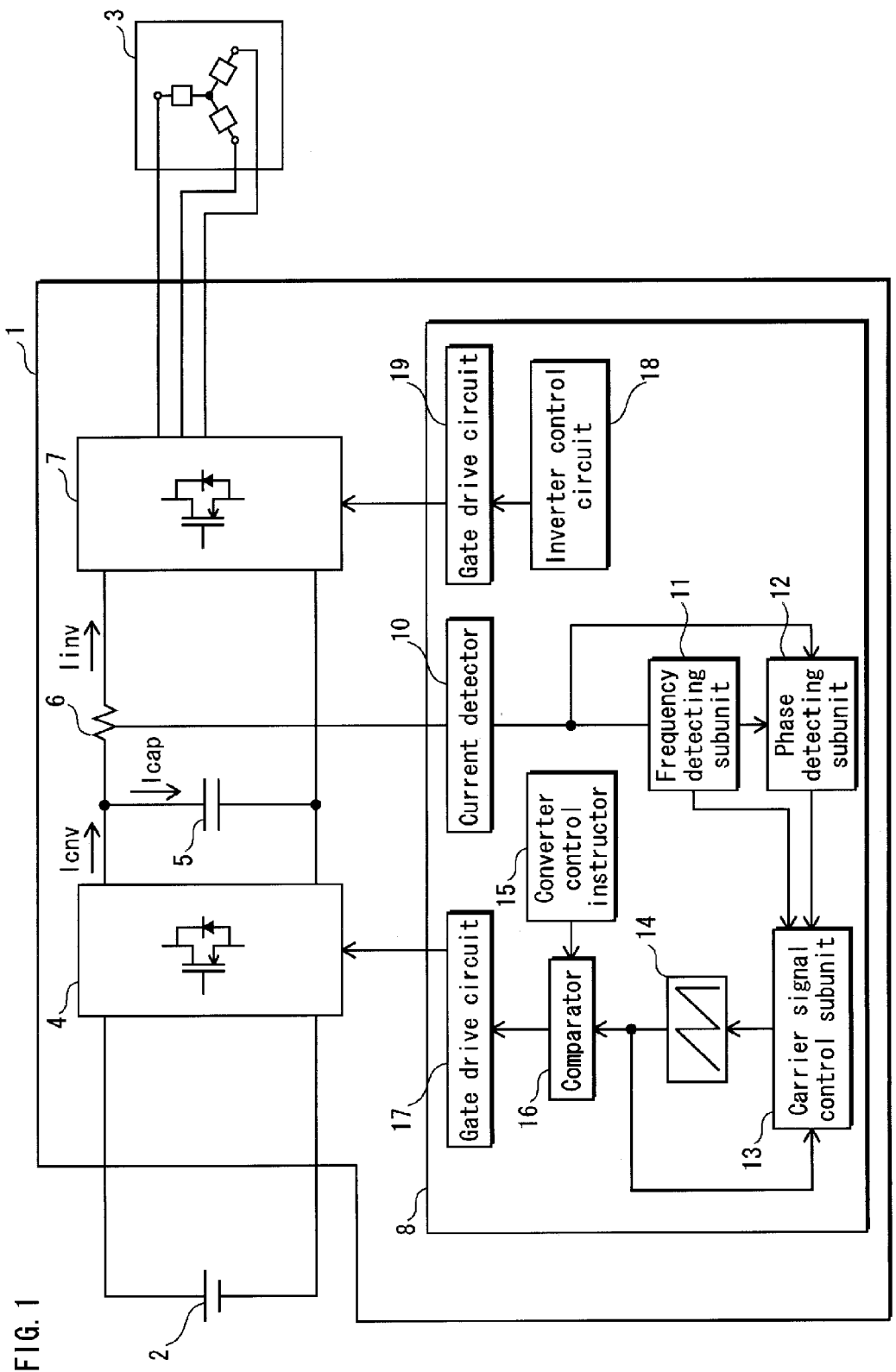
FIG. 1 shows a structure of a motor driving apparatus 1 pertaining to embodiment 1 of the present invention.

FIG. 1 shows a structure of a motor driving apparatus 1 that is an embodiment of an electric power converting apparatus of the present invention.

As FIG. 1 shows, the motor driving apparatus 1 includes a converter circuit 4, a capacitor 5, a current sensor 6, an inverter circuit 7 and a control unit 8. The converter circuit 4 is connected to a direct-current power source 2, and the inverter circuit 7 is connected to a motor 3.

The converter circuit 4 includes components such as an inductor and a switch. The converter circuit 4 boosts direct-current voltage supplied by the direct-current power source 2 to desired direct-current voltage, by switching on/off the switch according to Pulse Width Modulation (hereinafter, referred to simply as "PWM") control of the control unit 8. The switch is a transistor such as an IGBT and a MOSFET.

The inverter circuit 7 is a three-phase inverter for driving the motor 3. The inverter circuit 7 includes a switch such as an IGBT and a MOSFET like the converter circuit 4. Also, by switching on/off the switch according to the PWM control of the control unit 8, the inverter circuit 7 converts the direct-current voltage boosted by the converter circuit 4 into three-phase alternating current voltage for driving the motor 3 and variably controls the voltage to be output to the motor 3 by correcting current flow rate.

The capacitor 5 is connected between the converter circuit 4 and the inverter circuit 7, for reducing voltage variation of the direct-current voltage output by the converter circuit 4 and stabilizing motor drive. In the present embodiment, an electrolytic capacitor suitable for downsizing and cost reductions is used as the capacitor 5.

The current sensor 6 is disposed between the capacitor 5 and the inverter circuit 7 so as to be electrically connected to the capacitor 5 and the inverter circuit 7. The current sensor 6 detects current Iinv flowing from the capacitor 5 to the inverter circuit 7. Specifically, the current sensor 6 is a current converter including a resistance. The current sensor 6 measures a resistance value between the capacitor 5 and the inverter circuit 7 at a fixed sampling rate, converts the measured resistance value to a value within current range, which can be input into a current detector 10 described later, and inputs the converted resistance value into the current detector 10.

The control unit 8 is a computer system that includes a microprocessor, and includes a converter control function and an inverter control function. Specifically, as FIG. 1 shows, the control unit 8 includes the current detector 10, a frequency detecting subunit 11, a phase detecting subunit 12, a carrier signal control subunit 13, a carrier oscillator 14, a converter control instructor 15, a comparator 16, a gate drive circuit 17, an inverter control circuit 18 and a gate drive circuit 19.

According to the converter control function, the current Iinv detected by the current sensor 6 is input into the frequency detecting subunit 11 and the phase detecting subunit 12 through the current detector 10.

Figure 2:
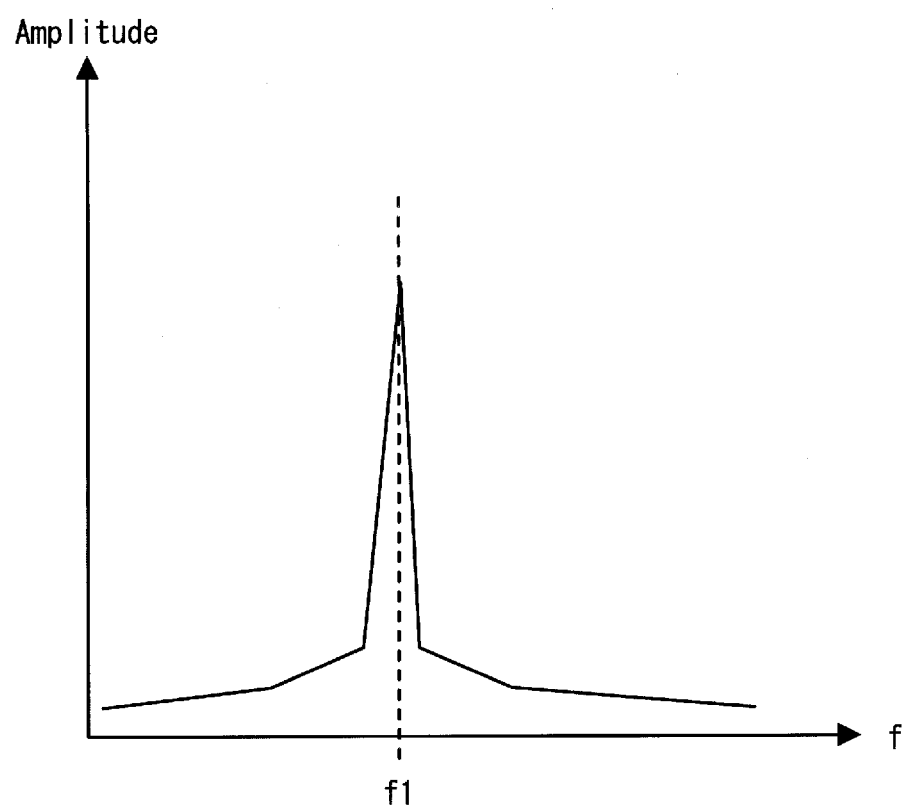
FIG. 2 shows a specific example of an output result of a frequency detecting subunit 11.

The frequency detecting subunit 11 extracts a frequency component having the largest current amount (largest amplitude) among frequency components included in the current Iinv, by performing fast Fourier transform (hereinafter, referred to as "FFT") that is one of frequency analyses, on a waveform of the current Iinv input from the current detector 10. FIG. 2 shows an output result when the FFT has been performed on the waveform of the current Iinv. According to the output result shown in FIG. 2, the frequency detecting subunit 11 detects a frequency f1. The frequency f1 is a frequency component having the largest current amount among the frequency components included in the current Iinv. The frequency detecting subunit 11 outputs the detected frequency f1 to the phase detecting subunit 12 and the carrier signal control subunit 13.

The phase detecting subunit 12 detects, based on the waveform input from the current detector 10 and the frequency f1 input from the frequency detecting subunit 11, a zero-cross point where a current value of the frequency f1 is zero from the waveform in a time direction. The phase detecting subunit 12 then outputs a pulse signal to the carrier signal control subunit 13, each time the zero-cross point is detected.

The carrier signal control subunit 13 controls a frequency and a phase of a PWM carrier signal that is generated by the carrier oscillator 14.

Specifically, the carrier signal control subunit 13 receives the frequency f1 detected by the frequency detecting subunit 11 and the pulse signal output by the phase detecting subunit 12. Furthermore, the carrier signal control subunit 13 receives a feedback signal generated by the carrier oscillator 14.

The carrier signal control subunit 13 compares a frequency of the feedback signal with the frequency f1, and corrects the frequency of the feedback signal to be matched with the frequency f1. Also, the carrier signal control subunit 13 compares a rise time of the feedback signal with the pulse signal received from the phase detecting subunit 12, and corrects the rise time of the feedback signal to be matched with a rise time of the pulse signal. The carrier signal control subunit 13 then informs the carrier oscillator 14 of the corrected frequency and phase (rise time).

The carrier oscillator 14 generates a PWM carrier signal having the frequency and the phase informed by the carrier signal control subunit 13. The carrier oscillator 14 inputs the generated PWM carrier signal to the comparator 16, and returns the PWM carrier signal (feedback signal) to the carrier signal control subunit 13 for feedback control.

It is therefore possible to match a frequency of the PWM carrier signal generated by the carrier oscillator 14 with the frequency f1, and also synchronize a rise time of the PWM carrier signal with a rise time of the frequency f1 of the current Iinv.

The PWM carrier signal generated by the carrier oscillator 14 is a sawtooth wave or a triangular wave. In case of the sawtooth wave, a time when a signal is on or a time when the signal is off is constant. In case of the triangular wave, neither a time when a signal is on nor a time when the signal is off is constant. Accordingly, in view of facilitating phase correction, the sawtooth wave is more preferable than the triangle wave as the PWM carrier signal.

The comparator 16 compares an amplitude of a signal waveform output by the carrier oscillator 14 with an amplitude of a signal waveform output by the converter control instructor 15, and outputs a signal to the gate drive circuit 17. The gate drive circuit 17 generates a converter gate signal by amplifying the output signal received from the comparator 16, and drives the switch of the converter circuit 4.

The inverter control function of the control unit 8 generates an inverter gate signal by amplifying the output signal of the inverter control circuit 18 using the gate drive circuit 19 based on system control, and drives the switch of the inverter circuit.

In the present embodiment, based on an actual measured value of the current Iinv flowing from the capacitor to the inverter circuit, a carrier frequency of the converter circuit is determined.

By using this method, the present embodiment is more effective in reducing ripple current, compared with methods that have been conventionally proposed, in which the carrier frequency the converter circuit is matched with or set to be twice as high as the carrier frequency of the inverter circuit.

This is because a carrier frequency of the inverter circuit is not necessarily matched with or twice as high as a frequency of a frequency component that has the largest current amount among frequency components included in the current Iinv flowing from the capacitor to the inverter.

The following describes a case where a carrier frequency of the inverter circuit is 2 kHz using a specific example.

Figure 11A:
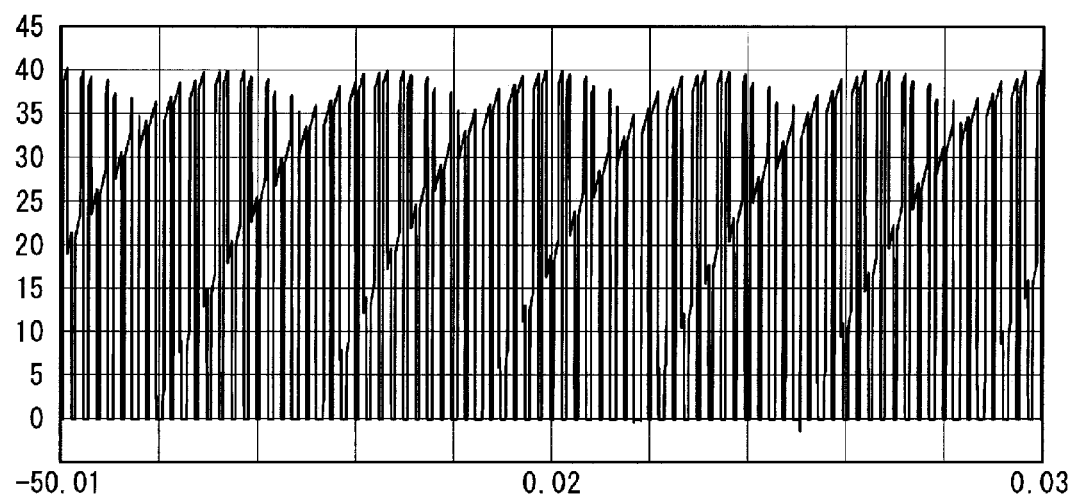
FIG. 11A shows ripple current Icap while an inverter circuit operates according to a control command of 50 Hz and FIG. 11B shows a result of FFT that has been performed on the ripple current Icap, when a carrier frequency of an inverter circuit is 2 kHz.
Figure 11B:
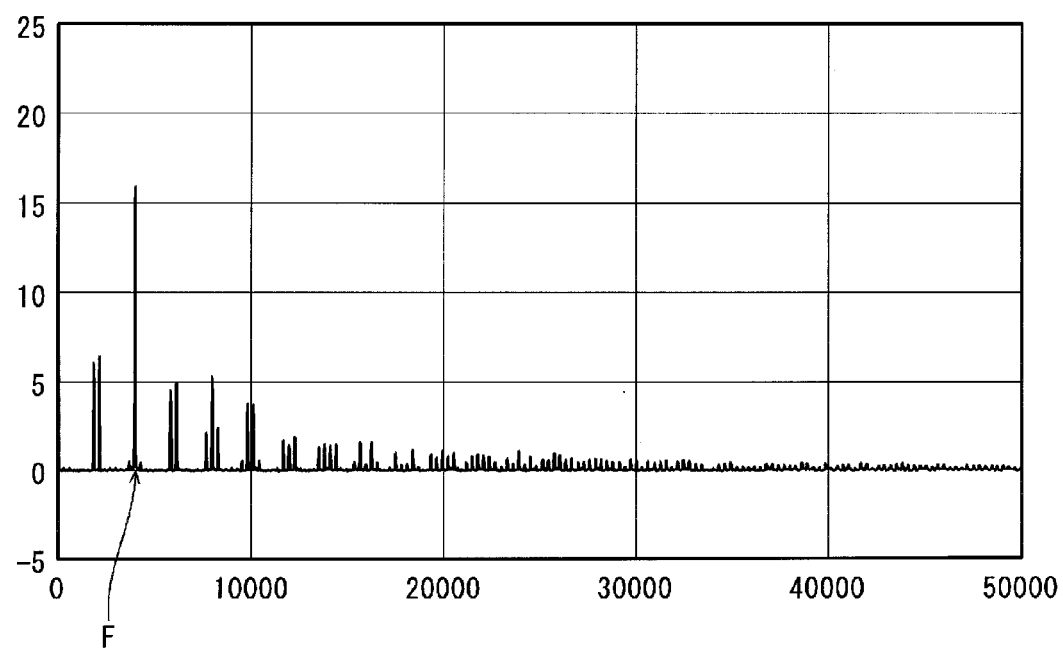

FIG. 11A shows a value of ripple current Icap flowing through the capacitor when the inverter circuit operates according to a control command with an electrical angular frequency of 50 Hz. FIG. 11B shows a result of FFT that has been performed on the ripple current Icap shown in FIG. 11A.

Figure 12A:
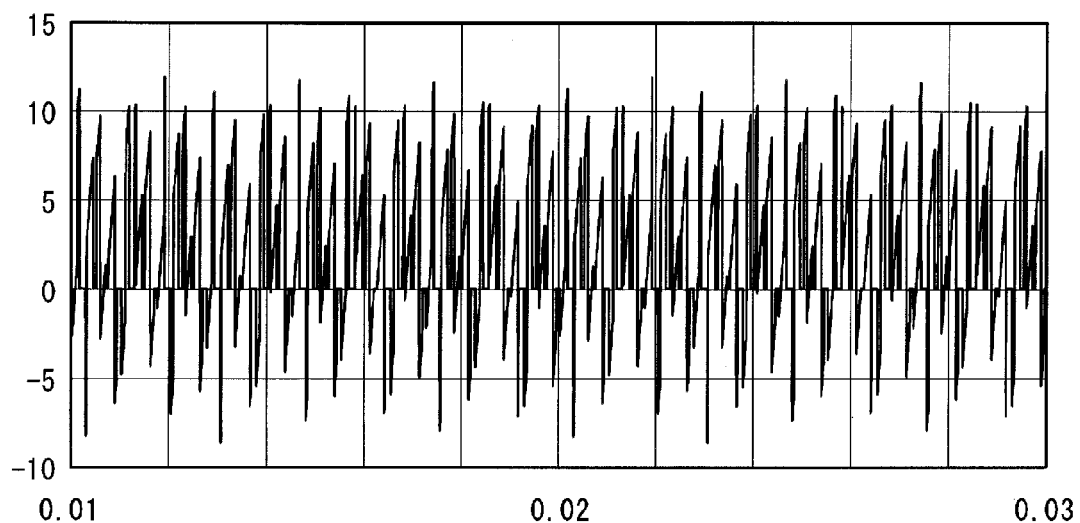
FIG. 12A shows ripple current Icap while the inverter circuit operates an operation according to a control command of 300 Hz and FIG. 12B shows a result of FFT that has been performed on the ripple current Icap, when the carrier frequency of the inverter circuit is 2 kHz.
Figure 12B:
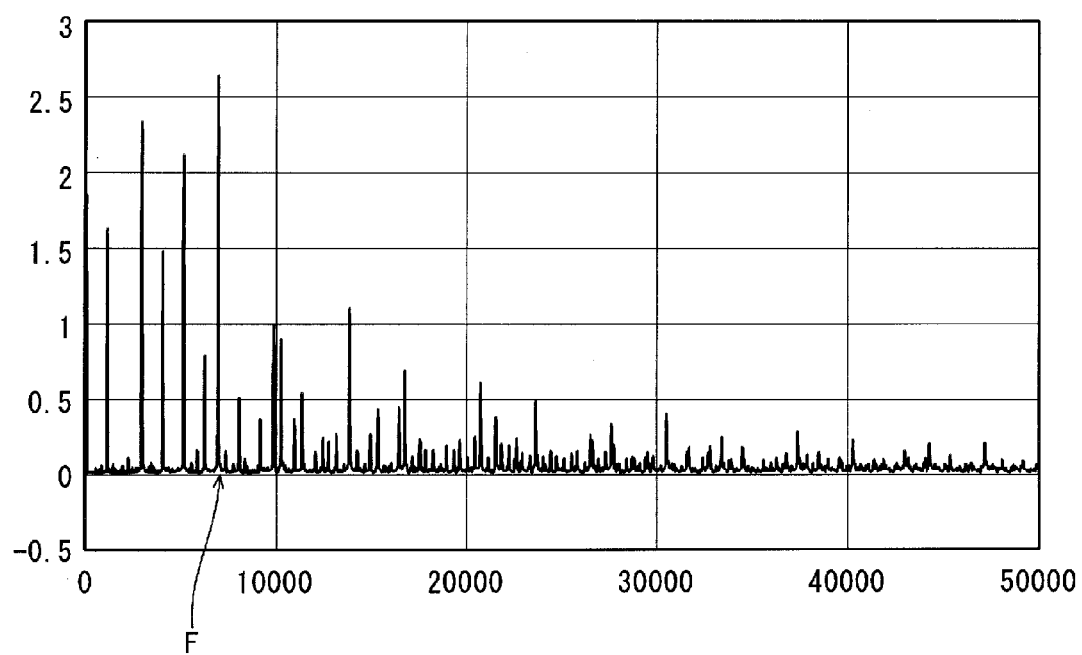

On the other hand, FIG. 12A shows a value of the ripple current Icap flowing through the capacitor when the inverter circuit operates according to a control command with an electrical angular frequency of 300 Hz. FIG. 12B shows a result of FFT that has been performed on the ripple current Icap shown in FIG. 12A.

As shown in FIG. 11B, a frequency component F having a maximum amplitude is approximately 4 kHz. On the other hand, as shown in FIG. 12B, a frequency component F having a maximum amplitude is approximately 7 kHz. That is, operating conditions of the inverter cause frequency components of the ripple current Icap to fluctuate.

When the inverter circuit operates according to the control command with an electrical angular frequency of 50 Hz and the carrier frequency of the converter circuit is set to be twice (4 kHz) as high as the carrier frequency (2 kHz) of the inverter circuit, it is possible to synchronize the current Icnv flowing from the converter circuit 4 to the capacitor 5 with the current Iinv flowing from the capacitor 5 to the inverter circuit 7.

However, when the inverter circuit operates according to the control command of 300 Hz, for synchronization of current Icnv with current Iinv, the carrier frequency of the converter circuit has to be set not twice but 3.5 times (7 kHz) as high as the carrier frequency of the inverter circuit.

Therefore, it is impossible to follow fluctuating operating conditions of the inverter circuit by simply setting the carrier frequency of the converter circuit to be twice as high as the carrier frequency of the inverter circuit, as conventionally proposed.

The present embodiment can determine the most appropriate carrier frequency of the converter circuit in response to the operating conditions of the inverter circuit, by measuring an actual value of the current Iinv flowing from the capacitor to the inverter circuit.

Then, by synchronizing the current Icnv flowing from the converter circuit 4 to the capacitor 5 with the current Iinv flowing from the capacitor 5 to the inverter circuit 7, it is possible to reduce the ripple current Icap flowing through the capacitor 5.

The reduction of the ripple current reduces an amount of heat generation of the capacitor, and allows to extend the life of the electrolytic capacitor. It is therefore possible to realize downsizing of the capacitor and the apparatus per se. Furthermore, the downsizing of the capacitor can reduce cost and increase freedom in arrangement.

Moreover, the reduction of the ripple current allows to reduce power supply noise.

Embodiment 2

Figure 3:
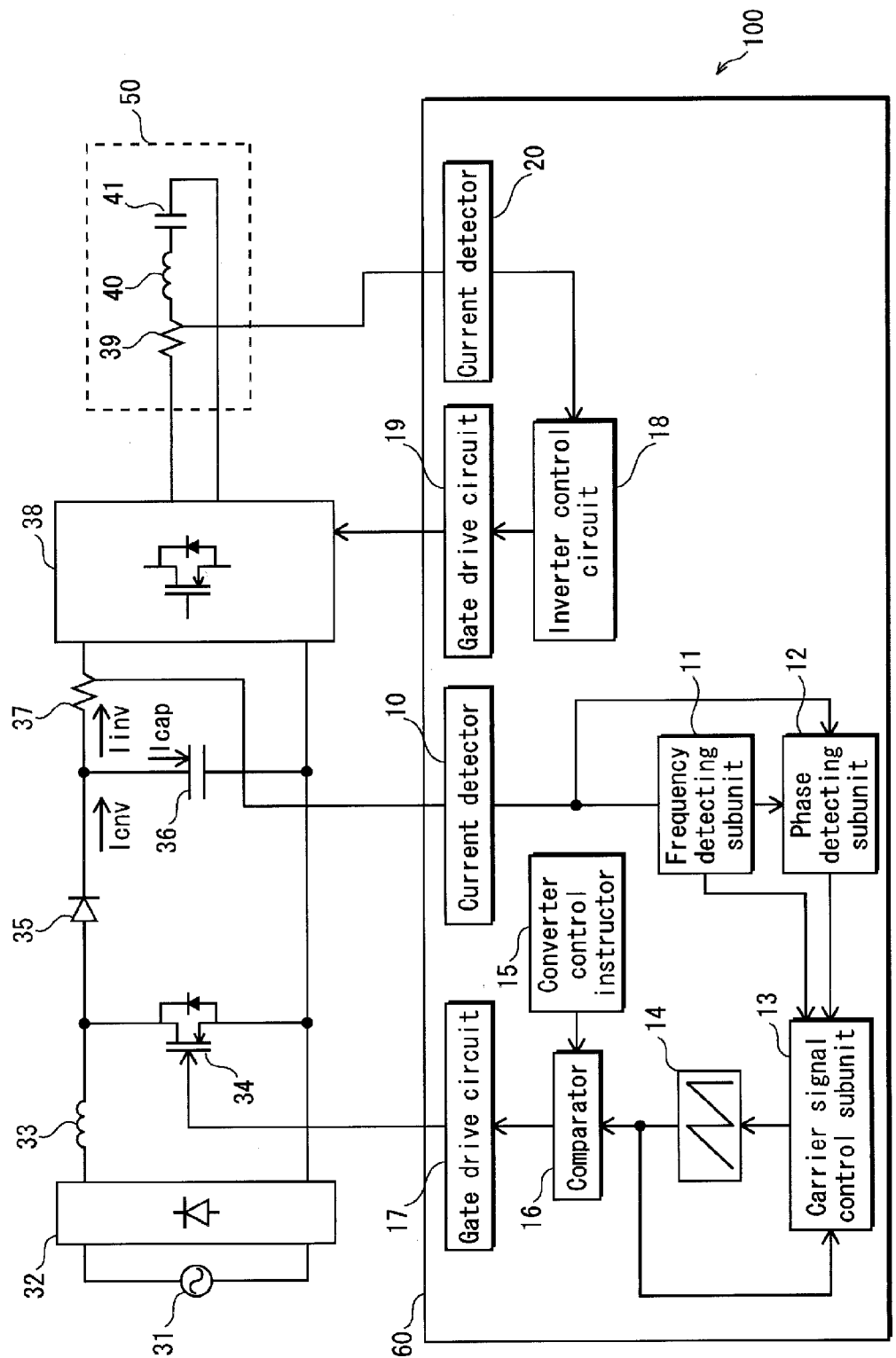
FIG. 3 shows a structure of an induction heating apparatus 100 pertaining to an embodiment 2 of the present invention.

FIG. 3 shows a structure of an induction heating apparatus 100 that is an embodiment of the induction heating apparatus of the present invention.

As FIG. 3 shows, the induction heating apparatus 100 includes a converter circuit, a capacitor 36, a current sensor 37, an inverter circuit 38, a heater 50 as a load circuit and a control unit 60. The converter circuit includes a diode bridge 32, a coil 33, a switch 34 and a diode 35. The heater 50 includes a current sensor 39, a heating coil 40, and a resonance capacitor 41.

Specifically, the induction heating apparatus 100 is a heating cooking instrument that includes a top plate, which is not illustrated, on an upper part of the heater 50, and heats a load pan placed on the top plate by supplying high frequency current from the inverter circuit 38 to the heating coil 40.

The converter circuit is connected to an alternating current source 31, and converts alternating-current voltage supplied by the alternating current source 31 to desired direct-current voltage by switching on/off the switch 34 according to PWM control of the control unit 60. The switch 34 is a transistor such as an IGBT and a MOSFET, like the embodiment 1.

The inverter circuit 38 is a single phase inverter. The inverter circuit 38 includes a switch that is a transistor such as an IGBT and a MOSFET like the converter circuit, and converts the direct-current voltage converted by the converter circuit to alternating-current voltage for heating the load pan by switching on/off the switch according to PWM control of the control unit 60. Also, the inverter circuit 38 corrects current flow rate depending on a type of a load pan that is a heated object, and variably controls voltage to the heater 50.

The capacitor 36 for smoothing is connected between the converter circuit and the inverter circuit 38 so as to reduce fluctuations of direct-current voltage output by the converter circuit and stabilizes heating of the load pan by the heater 50. The capacitor 36 for smoothing is an electrolytic capacitor that is suitable for downsizing and cost reductions, like the embodiment 1.

The current sensor 37 is a current converter including a resistance and disposed between the capacitor 36 and the inverter circuit 38 so as to be electrically connected to the capacitor 36 and the inverter circuit 38. The current sensor 37 detects the current Iinv that flows from the capacitor 36 to the inverter circuit 38.

The heater 50 includes the current sensor 39. The current sensor 39 is a current converter including a resistance, and is disposed between the inverter circuit 38 and the heating coil 40 so as to be electrically connected to the inverter circuit 38 and the heating coil 40. The current sensor 39 detects sine-wave resonant current flowing from the inverter circuit 38 to the heating coil 40. The current sensor 39 measures a resistance value at a predetermined sampling rate, converts the measured resistance value to a value within the current range, and outputs the converted value to a current detector 20.

The control unit 60 is a computer system including a microprocessor, and includes a converter control function and an inverter control function. Specifically, as FIG. 3 shows, the control unit 60 includes the current detector 10, the frequency detecting subunit 11, the phase detecting subunit 12, the carrier signal control subunit 13, the carrier oscillator 14, the converter control instructor 15, the comparator 16, the gate drive circuit 17, the inverter control circuit 18, the gate drive circuit 19 and a current detector 20.

In the control unit 60 shown in FIG. 3, the same compositional elements as those in the embodiment 1 have the same reference signs, and explanations of those elements will be omitted.

The converter control function of the control unit 60 is the same as the embodiment 1. The converter circuit receives a signal from the gate drive circuit 17 and converts input electric power into direct-current electric power of desired voltage. Also, the converter circuit converts the input current into a sine-wave form and reduces harmonics in the input current.

The inverter control function of the control unit 60 inputs a value of resonant current detected by the current sensor 39 of the heater 50 into the inverter control circuit 18 through the current detector 20, based on system control. The inverter control circuit 18 outputs a signal according to a load pan that is a heating target into the gate drive circuit 19, based on the value of the resonant current input from the current detector 20. The gate drive circuit 19 generates an inverter gate signal by amplifying the output signal and drives the switch of the inverter circuit 38.

The inverter circuit 38 performs a frequency conversion of direct-current voltage according to the type of the load pan, by receiving the inverter gate signal generated from the gate drive circuit 19 and driving the switch. The inverter circuit 38 then variably controls heating power of the heater 50 by varying the rate of the current.

According to the present embodiment, it is possible to reduce the ripple current Icap flowing through the capacitor 36 by synchronizing the current Icnv flowing from the converter circuit to the capacitor 36 with the current Iinv flowing from the capacitor 36 to the inverter circuit 38.

The reduction of the ripple current reduces an amount of heat generation of the capacitor, and allows to extend the life of the electrolytic capacitor. It is therefore possible to realize downsizing of the capacitor and the apparatus per se. Furthermore, the downsizing of the capacitor can reduce cost and increase freedom in arrangement.

Moreover, the reduction of the ripple current allows to reduce power supply noise.

In addition, the present embodiment, like the embodiment 1, determines a carrier frequency of the converter circuit, based on an actual measured value of the current Iinv flowing from the capacitor to the inverter circuit. Accordingly, like the embodiment 1, the present embodiment is more effective in reducing ripple current, compared with methods that have been conventionally proposed, in which the carrier frequency of the converter circuit is matched with or set to be twice as high as a frequency of the carrier frequency of the inverter circuit.

Embodiment 3

The embodiment 2 as described above includes the current sensor 37 between the capacitor 36 and the inverter circuit 38, and directly detects the current Iinv flowing from the capacitor 36 to the inverter circuit 38. The embodiment 3 explains an example that does not need the current sensor disposed between the capacitor 36 and the inverter circuit 38, by using a result detected by the current sensor 39 that is included in a load.

Figure 4:
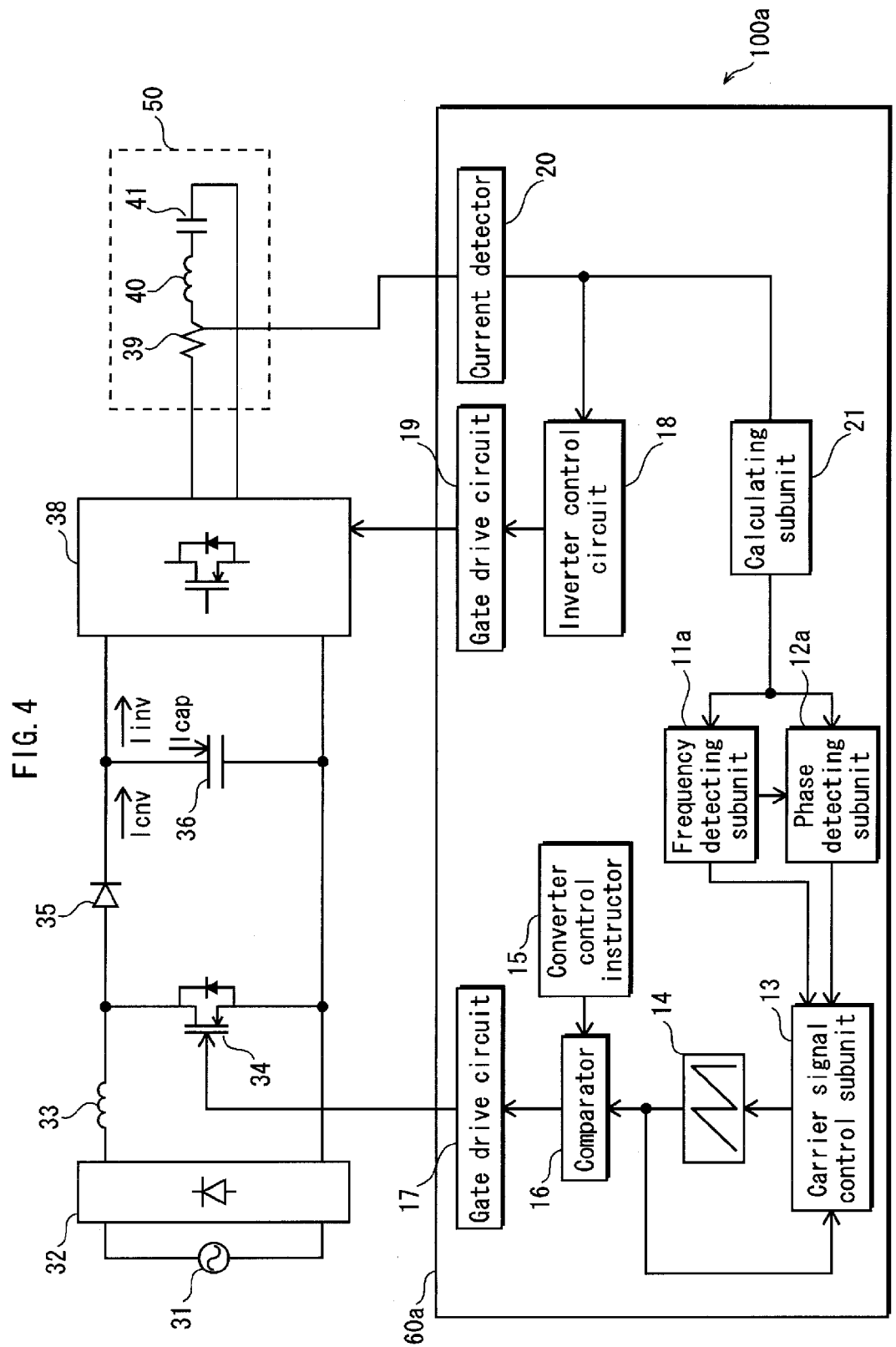
FIG. 4 shows a structure of an induction heating apparatus 100a pertaining to an embodiment 3 of the present invention.

FIG. 4 shows a structure of an induction heating apparatus 100a pertaining to an embodiment of the present invention.

As FIG. 4 shows, the induction heating apparatus 100a includes a converter circuit, the capacitor 36, the inverter circuit 38, the heater 50 and a control unit 60a. The converter circuit includes the diode bridge 32, the coil 33, the switch 34 and the diode 35. The heater 50 includes the current sensor 39, the heating coil 40 and the resonant capacitor 41.

The control unit 60a is a computer system including a microprocessor, and includes a converter control function and an inverter control function. Specifically, the control unit 60a includes a frequency detecting subunit 11a, a phase detecting subunit 12a, the carrier signal control subunit 13, the carrier oscillator 14, the converter control instructor 15, the comparator 16, the gate drive circuit 17, the inverter control circuit 18, the gate drive circuit 19, the current detector 20 and a calculating subunit 21.

In FIG. 4, the same compositional elements as those in the embodiment 2 (FIG. 3) have the same reference signs, and explanations of those elements will be omitted.

A compositional difference from the embodiment 2 is that the current sensor 37 is not disposed between the capacitor 36 and the inverter circuit 38, the control unit 60a does not include the current detector 10 and the control unit 60a includes the calculating subunit 21.

The frequency detecting subunit 11a and the phase detecting subunit 12a have the same function as the frequency detecting subunit 11 and the phase detecting subunit 12 of the embodiment 2. However, the embodiment 3 is different from the embodiment 2 in that input is connected not to the current detector but to the calculating subunit 21 that is a compositional element unique to the embodiment 3.

The calculating subunit 21 that is a component unique to the present embodiment calculates a waveform of the current Iinv flowing from the capacitor 36 to the inverter circuit 38, and then outputs the calculated waveform to the frequency detecting subunit 11a and the phase detecting subunit 12a.

Specifically, the calculating subunit 21 receives a current value of sine-wave resonant current flowing through the heating coil 40 from the current detector 20. The calculating subunit 21 then calculates a value of current flowing from the capacitor 36 to the inverter circuit 38 by calculating an absolute value of the received current value. Since the current sensor 39 and the current detector 20 sample the current value at a predetermined sampling rate, the calculating subunit 21 calculates a waveform of the current Iinv flowing from the capacitor 36 to the inverter circuit 38 by performing the above process each time the current value is input from the current detector 20.

The frequency detecting subunit 11a extracts the frequency f1 that is the frequency component having the largest current amount (maximum amplitude) among the frequency components included in the current Iinv input from the calculating subunit 21. The frequency f1 is extracted by performing FFT on the waveform of the current Iinv in a time axis direction, in the same way as the frequency detecting subunit 11 in the embodiment 2.

The phase detecting subunit 12a detects the zero-cross point where a current value of the frequency f1 is zero, based on the waveform input from the calculating subunit 21 and the frequency f1 input from the frequency detecting subunit 11a, in the same way as the phase detecting subunit 12 of the embodiment 2. Also, the phase detecting subunit 12a outputs a pulse signal to the carrier signal control subunit 13, each time the zero-cross point is detected.

According to the present embodiment, even when the current sensor detecting the current Iinv flowing from the capacitor 36 to the inverter circuit 38 is not used, it is possible to synchronize the current Icnv flowing from the converter circuit to the capacitor 36 with the current Iinv flowing from the capacitor 36 to the inverter circuit 38, by using a detection result of the current sensor 39 included in the heater 50.

Synchronization of the current Icnv with the current Iinv can reduce the ripple current Icap flowing through the capacitor 36. When ripple current is reduced, it is possible to reduce an amount of heat generation of the capacitor and then extend the life of the capacitor. Accordingly, it is possible to realize downsizing of the capacitor and the apparatus per se. Also, the downsizing of the capacitor can reduce cost and increase freedom in arrangement.

Furthermore, the reduction of the ripple current can reduce power noise.

Embodiment 4

The embodiment 3 has shown an example in which the waveform of the current Iinv is calculated based on the detection result of the current sensor 39 on the load, without directly detecting the current Iinv.

The embodiment 4 explains an example as follows. When an operating range of the induction heating apparatus is predictable, a plurality of operating patterns are prepared beforehand, without using the current sensor directly detecting the current Iinv. Then, in case of a predetermined operating pattern, a frequency and a phase of a PWM carrier signal for effectively reducing the ripple current Icap is set.

Figure 5:
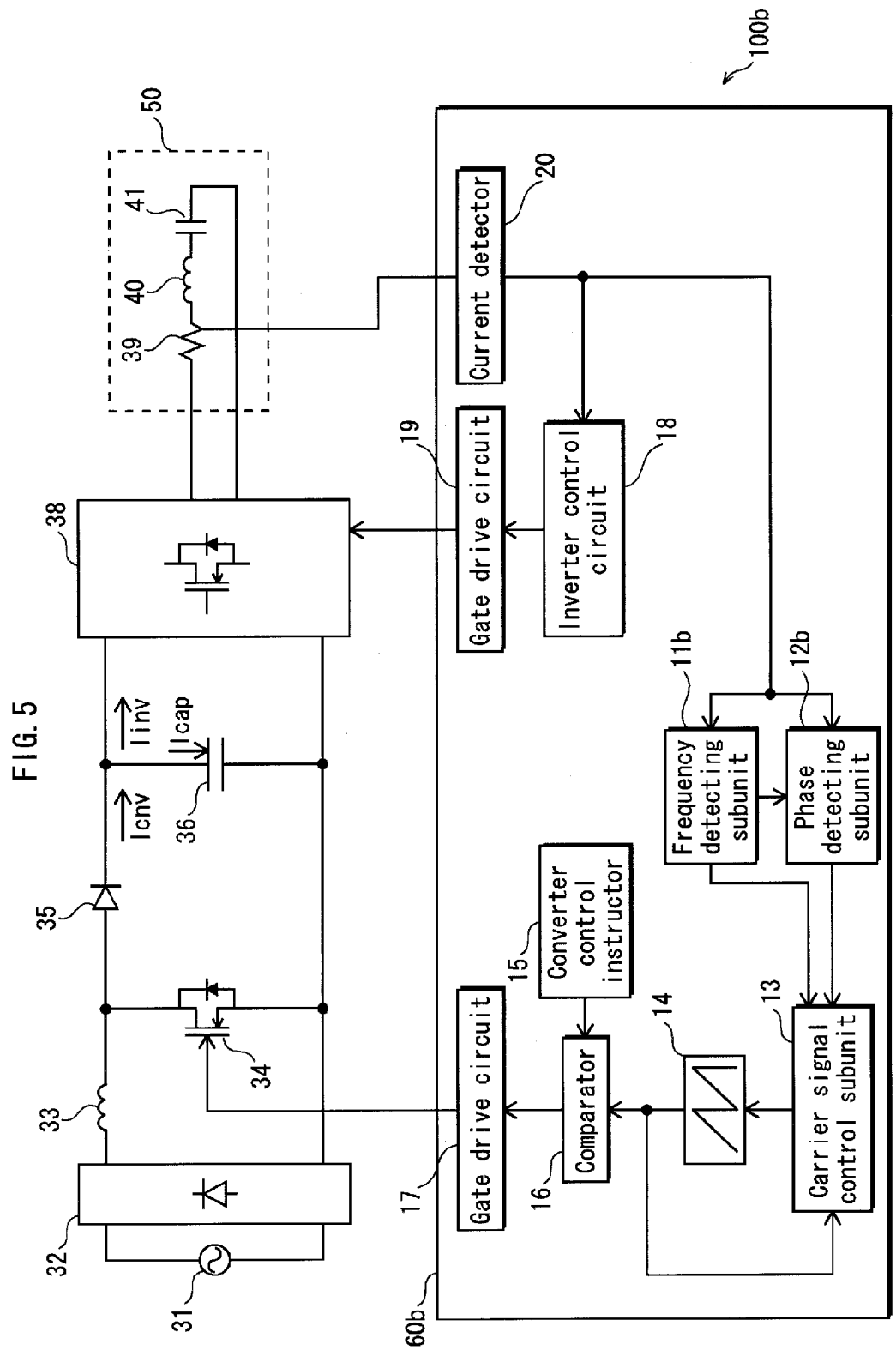
FIG. 5 shows a structure of an induction heating apparatus 100b pertaining to an embodiment 4 of the present invention.

FIG. 5 shows a structure of an induction heating apparatus 100b pertaining to an embodiment of the present invention.

As FIG. 5 shows, the induction heating apparatus 100b includes a converter circuit, the capacitor 36, the inverter circuit 38, and the heater 50 and a control unit 60b. The converter circuit includes the diode bridge 32, the coil 33, the switch 34 and the diode 35. The heater 50 includes the current sensor 39, the heating coil 40 and the resonant capacitor 41.

The control unit 60b is a computer system including a microprocessor, and includes a converter control function and an inverter control function. Specifically, the control unit 60b includes a frequency detecting subunit 11b, a phase detecting subunit 12b, the carrier signal control subunit 13, the carrier oscillator 14, the converter control instructor 15, the comparator 16, the gate drive circuit 17, the inverter control circuit 18, the gate drive circuit 19, and the current detector 20.

In FIG. 5, the same compositional elements as those in the embodiment 3 (FIG. 4) have the same reference signs and explanations of those elements will be omitted.

A compositional difference from the embodiment 3 is that the control unit 60b does not include the calculating subunit and a result detected by the current detector 20 is input into the frequency detecting subunit 11b and the phase detecting subunit 12b.

When the heater 50 heats a pan made of a low-resistance nonmagnetic material such as aluminum (hereinafter, referred to simply as "aluminum pan"), sine-wave resonant current of 90 kHz is supplied to the heating coil 40, for example. In this time, the frequency of the frequency component having the largest current amount among the frequency components included in the current Iinv flowing from the capacitor 36 to the inverter circuit 38 is 180 kHz.

On the other hand, when the heater 50 heats a pan made of a magnetic material such as iron (hereinafter, referred to simply as "iron pan"), sine-wave resonant current of 23 kHz is supplied to the heating coil 40, for example. In this time, the frequency of the frequency component having the largest current amount among the frequency components included in the current Iinv flowing from the capacitor 36 to the inverter circuit 38 is 46 kHz.

Accordingly, the frequency detecting subunit 11b stores therein beforehand a table 70 shown in FIG. 6.

In the table 70, a converter carrier frequency of 180 kHz (expected frequency) is corresponded with a frequency of the resonant current of 90 kHz, and a converter carrier frequency of 46 kHz (expected frequency) is corresponded with a frequency of the resonant current of 23 kHz.

When a current value of resonant current flowing through the heating coil 40 is input into the frequency detecting subunit 11b in sequence, a frequency of resonant current is detected based on the input current value. That is, the frequency detecting subunit 11b of the present embodiment does not perform advanced processing such as FFT and has only to include a simple frequency detector.

When the frequency of the detected resonant current is 90 kHz, the frequency detecting subunit 11b refers to the table 70, and inputs, as the frequency f1, the converter carrier frequency of 180 kHz corresponded with the resonant current of 90 kHz into the phase detecting subunit 12b and the carrier signal control subunit 13.

Also, when the frequency of the detected resonant current is 23 kHz, the frequency detecting subunit 11b refers to the table 70, and inputs, as the frequency f1, the converter carrier frequency of 46 kHz corresponded with the resonant current of 23 kHz into the phase detecting subunit 12b and the carrier signal control subunit 13.

The phase detecting subunit 12b calculates a waveform of the current Iinv in the time axis direction, based on current values of the resonant current received in sequence from the current detector 20. A calculating method may be the same as that used by the calculating subunit 21 of the embodiment 3. Also, the phase detecting subunit 12b receives the frequency f1 from the frequency detecting subunit 11b. The phase detecting subunit 12b detects a zero-cross point where a current value of the frequency f1 is zero, based on the calculated waveform and the frequency f1 that has been received from the frequency detecting subunit 11b. The phase detecting subunit 12b then outputs a pulse signal to the carrier signal control subunit 13, each time the zero-cross point is detected.

Besides, the table 70 shown in FIG. 6 is an example. Other than the aluminum pan and the iron pan, a plurality of patterns may be stored in the table 70, in accordance with a variety of load pans that are heating targets of the induction heating apparatus 100b.

The present embodiment predicts the frequency (f1) of the frequency component having the largest current amount among the frequency components included in the current Iinv, based on the frequency of the resonant frequency. With this structure, a current sensor directly detecting the current Iinv is not needed, and furthermore, a calculation of FFT by the frequency detecting subunit 11b is also not needed.

In the present embodiment, it is possible to synchronize the current Icnv flowing from the converter circuit to the capacitor 36 with the current Iinv flowing from the capacitor 36 to the inverter circuit 38, like other embodiments. It is therefore possible to reduce the ripple current Icap flowing through the capacitor 36.

When ripple current is reduced, it is possible to reduce an amount of heat generation of the capacitor and then extend the life of the capacitor. Accordingly, it is possible to realize downsizing of the capacitor and the apparatus per se. Also, the downsizing of the capacitor can reduce cost and increase freedom in arrangement.

Furthermore, the reduction of the ripple current can reduce power noise.

Figure 7:
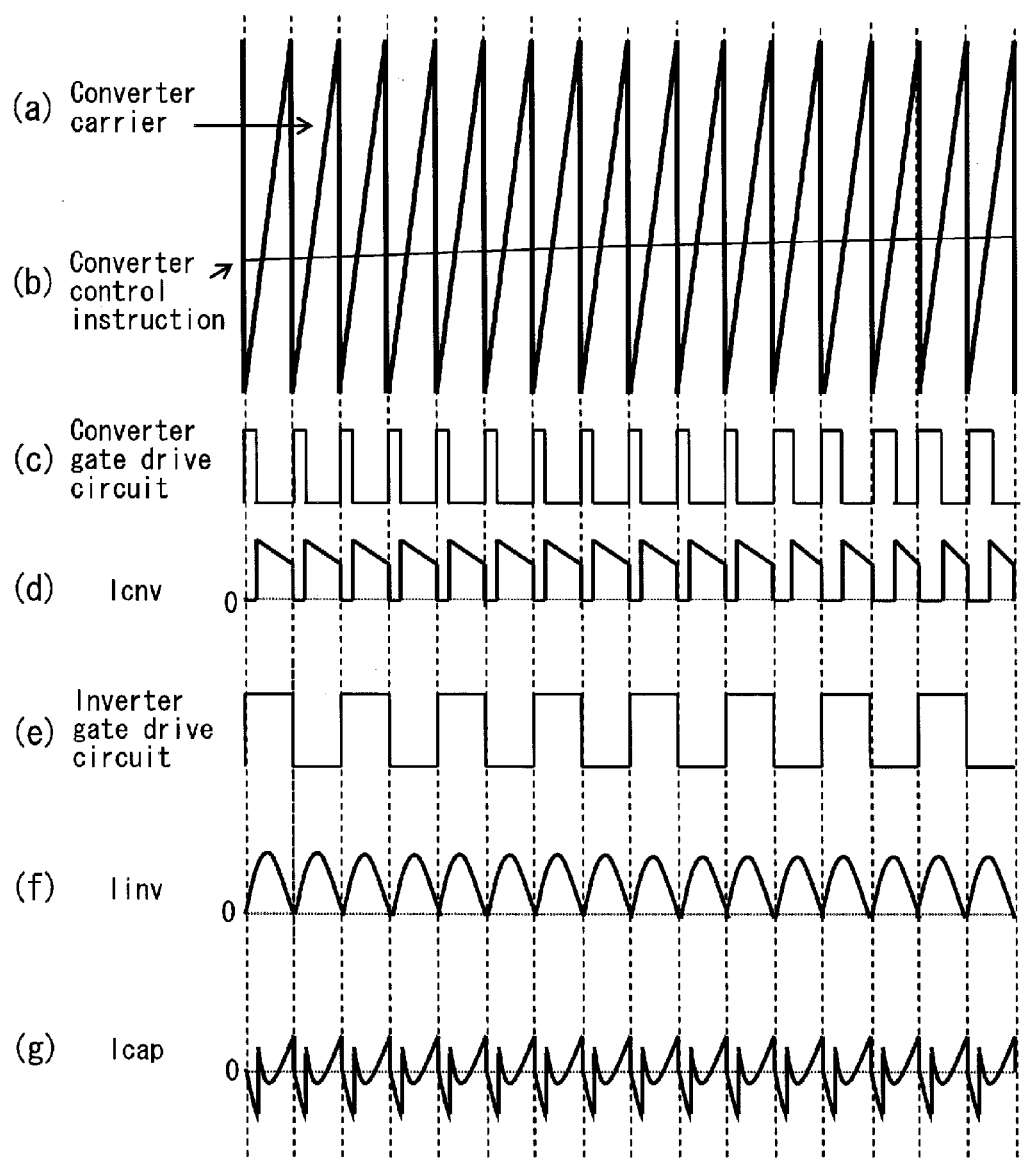
FIG. 7 is a waveform chart explaining control by the induction heating apparatus 100b.

FIG. 7 is a waveform chart explaining a converter control and an inverter control by the control unit 60b of the present embodiment more specifically.

A waveform (a) indicates a carrier signal generated by the carrier oscillator 14.

A waveform (b) indicates a converter control command generated by a converter control instructor 15.

A waveform (c) indicates a converter gate signal generated by the gate drive circuit 17. The gate drive circuit 17 generates a converter gate signal by comparing an amplitude of the carrier signal indicated by the waveform (a) with an amplitude of the converter control command indicated by the waveform (b), and drives the switch 34 of the converter circuit.

A waveform (d) indicates the current Icnv output from the converter circuit to the capacitor 36. More specifically, the current Icnv flows through the diode 35 while the switch 34 is off.

A waveform (e) indicates an inverter gate signal generated by the gate drive circuit 19. The gate drive circuit 19 supplies fixed resonant current to the heating coil 40, and accordingly drives a switch of the inverter circuit 38 at a fixed frequency.

A waveform (f) indicates the current Iinv flowing from the capacitor 36 to the inverter circuit 38. The current Iinv has frequency components twice as many as the resonant current flowing through the heating coil 40 has.

A waveform (g) indicates the ripple current Icap flowing through the capacitor 36.

In FIG. 7, a frequency of the converter carrier signal indicated by the waveform (a) is set to be twice as high as the frequency of the resonant current, that is, set to the frequency of the current Iinv indicated by the waveform (f).

Also, a rise time of the converter carrier signal indicated by the waveform (a) is synchronized with a zero-cross point of the current Iinv indicated by the waveform (f). Such a control can reduce the ripple current Icap indicated by the waveform (g).

FIGS. 8A and 8B show examples of simulation results for explaining a reduction effect of the ripple current Icap.

FIG. 8A shows each waveform of the current Icnv, current Iinv and current Icap when a frequency of the converter carrier signal is set to be 45 kHz and a resonant current frequency of the inverter is set to be 90 kHz. In this case, a current effective value of the current Icap is 49 Arms in a waveform segment of a predetermined time length.

FIG. 8B shows each waveform of the current Icnv, current Iinv and current Icap when a frequency of the converter carrier signal is set to be 180 kHz and a resonant current frequency of the inverter is set to be 90 kHz. In this case, a current effective value of the current Icap is 34 Arms in the waveform segment of the predetermined time length.

Accordingly, by setting the frequency of the converter carrier signal to be twice as high as the resonant current frequency of the inverter and synchronizing their phases, it is possible to reduce the ripple current Icap by approximately 30%.

Embodiment 5

The following explains an induction heating apparatus 100c that is an embodiment of the induction heating apparatus of the present invention.

Figure 9:
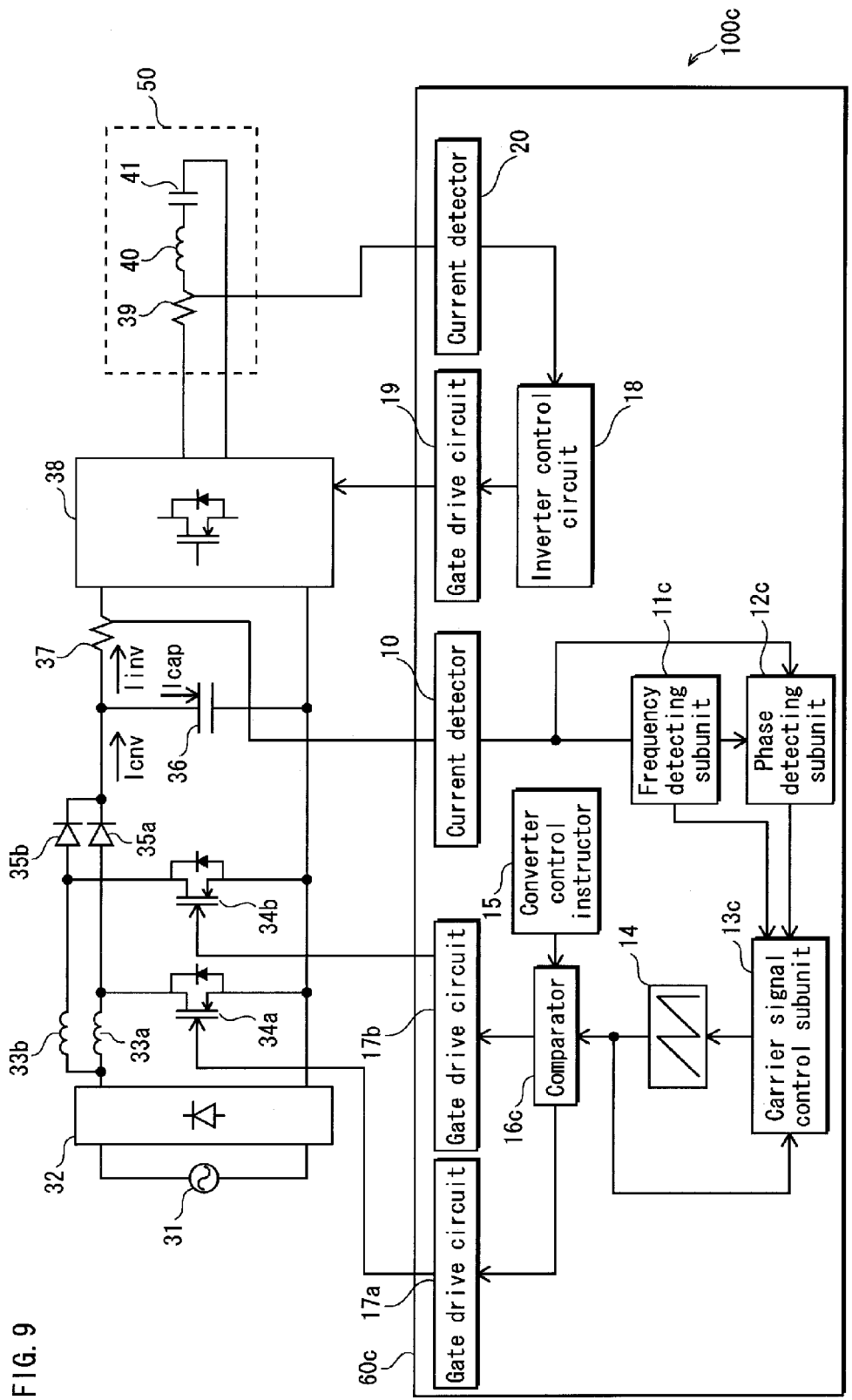
FIG. 9 shows a structure of an induction heating apparatus 100c pertaining to an embodiment 5 of the present invention.

FIG. 9 shows a structure of the induction heating apparatus 100c. As FIG. 9 shows, the induction heating apparatus 100c includes a converter circuit, the capacitor 36, the current sensor 37, the inverter circuit 38, the heater 50 and a control unit 60c. The converter circuit includes the diode bridge 32, coils 33a and 33b, switches 34a and 34b and diodes 35a and 35b. The heater 50 includes the current sensor 39, the heating coil 40 and the resonance capacitor 41.

The control unit 60c is a computer system that includes a microprocessor, and includes a converter control function and an inverter control function. Specifically, the control unit 60c includes the current detector 10, a frequency detecting subunit 11c, a phase detecting subunit 12c, a carrier signal control subunit 13c, the carrier oscillator 14, the converter control instructor 15, a comparator 16c, a gate drive circuit 17a, the inverter control circuit 18, the gate drive circuit 19 and the current detector 20.

In FIG. 9, the same compositional elements as those in the embodiment 2 (FIG. 3) have the same reference signs, and explanations of those elements will be omitted.

A compositional difference from the embodiment 2 is that the converter circuit uses a two-phase converter that includes the coils 33a and 33b that are inductors.

First, there is an explanation of the two-phase inverter used in the present embodiment.

The two-phase inverter of the induction heating unit 100c is driven by an interleave method as follows. The two switches 34a and 34b to which the coils 33a and 33b are respectively connected are turned on and off alternately by the gate drive circuits 17a and 17b of the control unit 60c, with 180 degrees phase shift.

Thus, by driving the switches 34a and 34b with 180 degrees phase shift, output from the diodes 35a and 35b that are respectively connected to the switches 34a and 34b is divided into two current passages. This decreases a current value of each current passage. Accordingly, it is possible to decrease switching current of the switches 34a and 34b.

Next, there is an explanation of the converter control function of the present embodiment.

In the present embodiment, like the embodiment 2, the current sensor 37 is disposed between the capacitor 36 and the inverter circuit 38 so as to be electrically connected to the capacitor 36 and the inverter circuit 38, and the current Iinv flowing through the inverter circuit 38 is directly detected. The frequency detecting subunit 11c of the control unit 60c then performs a calculation of FFT on a waveform of the current Iinv, and extracts the frequency f1 of the frequency component having the largest current amount (largest amplitude) among the frequency components included in the current Iinv. The frequency detecting subunit 11c then outputs the extracted frequency f1 to the phase detecting subunit 12c. Also, the frequency detecting subunit 11c outputs a frequency f2 that is ½ times as high as the extracted frequency f1 to the carrier signal control subunit 13c.

The phase detecting subunit 12c detects a zero-cross point where a current value of the frequency f1 is zero, based on a waveform received from the current detector 10. The phase detecting subunit 12c then outputs a pulse signal to the carrier signal control subunit 13, every second time the zero-cross point is detected.

The carrier signal control subunit 13c compares a frequency of a feedback signal received from the carrier oscillator 14 with the frequency f2, and then corrects the frequency of the feedback signal to be matched with the frequency f2. Also, the carrier signal control subunit 13c compares a rise time of the feedback signal with the pulse signal received from the phase detecting subunit 12c, and then corrects the rise time of the feedback signal to be matched with the rise time of the pulse signal.

The comparator 16c compares an amplitude of a PWM carrier signal from the carrier oscillator 14 with an amplitude of a converter control command from the converter control instructor 15, and then outputs an output signal to the gate drive circuits 17a and 17b.

Each of the gate drive circuits 17a and 17b generates a converter gate signal by amplifying the output signal, outputs the generated converter gate signal to the converter circuit, and drives the switches 34a and 34b.

Figure 10:
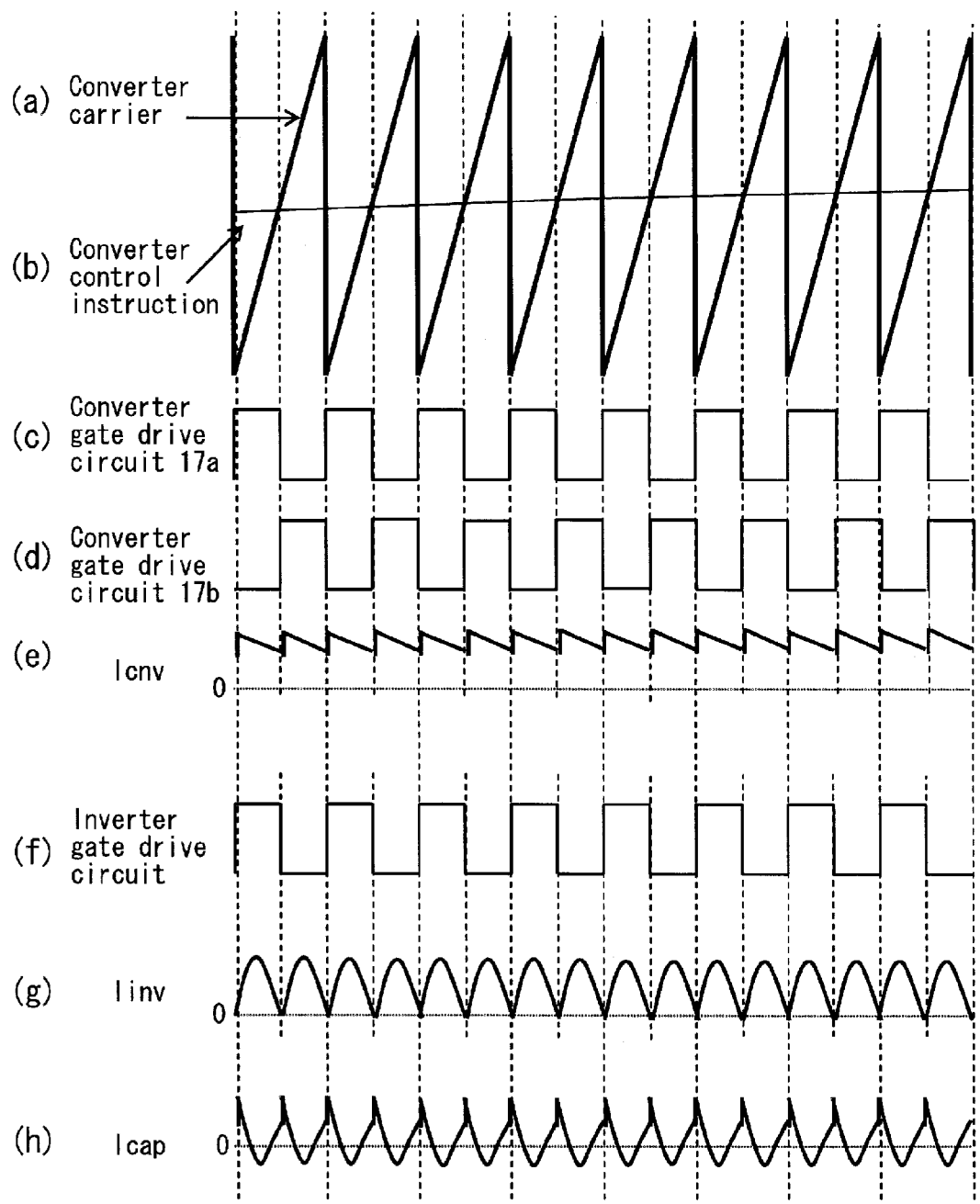
FIG. 10 is a waveform chart explaining control by the induction heating apparatus 100c and its modification.

At that time, the comparator 16c outputs output signals with 180 degrees phase shift to the gate drive circuits 17a and 17b. In FIG. 10, a waveform (c) indicates a converter gate signal output from the gate drive circuit 17a to the switch 34a, and a waveform (d) indicates a converter gate signal output from the gate drive circuit 17b to the switch 34b. As the waveforms (c) and (d) indicate, a phase of the converter gate signal is shifted by 180 degrees.

The comparator 16c drives the switches 34a and 34b by the above interleave method, by outputting the output signals each of whose phase is shifted by 180 degrees to the gate drive circuits 17a and 17b.

Next, there is an explanation of a modification of the present embodiment.

In the present embodiment, the current sensor 37 is disposed between the capacitor 36 and the inverter circuit 38 so as to be electrically connected to the capacitor 36 and the inverter circuit 38, and the current Iinv flowing from the capacitor 36 to the inverter circuit 38 is directly detected. However, if it is possible to predict the frequency of the frequency component having the largest current amount (f1) among the frequency components included in the current Iinv, like the embodiment 4, it is possible to determine the frequency of the converter carrier signal (f2), based on the frequency f1. By performing such a control, the current sensor directly detecting the current Iinv is not needed, and furthermore a calculation of FFT by the frequency detecting subunit 11 is also not needed.

As explained in the embodiment 4, when the heater 50 heats the aluminum pan, the sine-wave resonant current of 90 kHz is supplied to the heating coil 40. At that time, the frequency of the frequency component having the largest current amount (f1) among frequency components included in the current Iinv flowing from the capacitor 36 to the inverter circuit 38 is 180 kHz. In this case, the frequency of the converter carrier signal (f2) may be ½ times as high as the frequency f1, that is, 90 kHz that is same as the frequency of the resonant current.

Also, when the heater 50 heats the iron pan, the sine-wave resonant current of 23 kHz is supplied to the heating coil 40. At that time, the frequency of the frequency component having the largest current amount (f1) among the frequency components included in the current Iinv flowing from the capacitor 36 to the inverter circuit 38 is 46 kHz. In this case, the frequency of the converter carrier signal (f2) may be ½ times as high as the frequency f1, that is, 23 kHz that is same as the frequency of the resonant current.

FIG. 10 is a waveform chart for explaining a converter control and an inverter control of the present embodiment and its modification more specifically.

A waveform (a) indicates a carrier signal generated by the carrier oscillator 14.

A waveform (b) indicates a converter control command generated by a converter control instructor 15.

A waveform (c) indicates a converter gate signal generated by the gate drive circuit 17a.

A waveform (d) indicates a converter gate signal generated by the gate drive circuit 17b.

A waveform (e) indicates the current Icnv output from the converter circuit to the capacitor 36. More specifically, the current Icnv is a sum of current flowing through the diode 35a and current flowing through the diode 35b while the switches 34a and 34b are alternately off.

A waveform (f) indicates an inverter gate signal generated by the gate drive circuit 19. The gate drive circuit 19 drives a switch of the inverter circuit 38 at a fixed frequency to supply fixed resonant current to the heating coil 40.

A waveform (g) indicates the current Iinv flowing from the capacitor 36 to the inverter circuit 38. The current Iinv has frequency components twice as many as the resonant current flowing through the heating coil 40 has.

A waveform (h) indicates ripple current Icap flowing through the capacitor 36.

In FIG. 10, a frequency of the converter carrier signal indicated by the waveform (a) is matched with the frequency of the resonant current, that is, ½ times as high as the frequency of the current Iinv indicated by the waveform (f). Also, a rise time of the converter carrier signal indicated by the waveform (a) is synchronized with a zero-cross point when the frequency of the current Iinv indicated by the waveform (f) is multiplied by ½.

Such a control can synchronize the current Icnv indicated by the waveform (e) with the current Iinv indicated by the waveform (f), and accordingly reduce the ripple current Icap flowing through the capacitor 36 and indicated by the waveform (g).

6. Other Modifications

Although the present invention has been explained based on the above embodiments, it is natural that the present invention is not limited to the above embodiments, and the following may be included in the present invention.

(1) According to the above embodiments 1-5, the converter circuit has been explained as a booster converter for boosting power voltage. However, the present invention is not limited to this. A converter circuit for depressing power voltage may be used.

(2) According to the above embodiments 1, 2 and 5, fast Fourier transform (FFT) is used as a frequency analysis performed by the frequency detecting subunit. However, the frequency analysis used in the present invention is not limited to this. For example, using transform such as cosine transform, wavelet transform, and Hadamard transform, the frequency of the frequency component having the largest amplitude (f1) may be detected based on the waveform of the current Iinv in the time axis direction.

(3) According to the above embodiment 4, the frequency detecting subunit 11b stores therein the table 70 in accordance with operating patterns of heating the load pan. However, the present invention is not limited to such a structure, and the present invention includes a case where the frequency detecting subunit 11b does not include the table 70. In this case, when the frequency detecting subunit 11b detects a frequency of resonant current, a frequency that is twice as high as the detected frequency is output to the carrier signal control subunit 11b as a frequency of the frequency component having the largest amplitude (f1) of the current Iinv.

(4) The above embodiment 5 has been explained using the two-phase converter including the two inductors as the converter circuit. However, the present invention is not limited to such a structure. The present invention also includes a case of using a multiple converter having N (N is a natural number equal to or greater than three) inductors, as the converter circuit.

In this case, based on resonant current flowing through the heating coil detected by the current sensor on the load, the carrier signal control subunit may control a frequency of the converter carrier signal such that a frequency of integrated current formed by integrating current output by the N inductors matches a frequency twice as high as the frequency of the resonant current. Also, the carrier signal control subunit may perform control such that a rise time of the converter carrier signal synchronizes a phase of a frequency twice as high as the resonant current.

Also, when the current sensor for detecting the current Iinv is disposed between the capacitor and the inverter circuit, the carrier signal control subunit may control the frequency of the converter carrier signal such that the frequency of the output current matches the frequency of the frequency component having the largest current amount among the frequency components included in the current Iinv.

(5) The above embodiments 1-5 have been explained using the motor 3 or the heating coil 40 as a load that receives power supply from the inverter circuit. However, the load in the present invention is not limited to this.

(6) The present invention includes any combination of the above embodiments 1-5 and modifications.

INDUSTRIAL APPLICABILITY

The present invention can be used as a technology for reducing the ripple current of the capacitor in an industry that manufactures and sells a power converter for supplying power to a load such as a motor and a heating coil.

REFERENCE SIGNS LIST 1 motor driving apparatus
2 direct-current power source
3 motor
4 converter circuit
5 capacitor
6 current sensor
7 inverter circuit
8 control unit
10 current detector
11, 11a, 11b, 11c frequency detecting subunits
12, 12a, 12b, 12c phase detecting subunits
13, 13c carrier signal control subunits
14 carrier oscillator
15 converter control instructor
16, 16c comparators
17, 17a, 17b gate drive circuits
18 inverter control circuit
19 gate drive circuit
20 current detector
21 calculating subunit
31 alternating current source
32 diode bridge
33, 33a, 33b coils (inductors)
34, 34a, 34b switches
35, 35a, 35b diodes
36 capacitor
37 current sensor
38 inverter circuit
39 current sensor
40 heating coil
41 resonant capacitor
50 heater
60, 60a, 60b, 60c control units
100, 100a, 100b, 100c induction heating apparatuses

The invention claimed is:

1. A power converter comprising:
a converter circuit that transforms an input power-supply voltage to a transformed output voltage, the converter circuit including a switch that is switched by a converter gate signal;
a capacitor smoothing the output voltage output by the converter circuit;
an inverter circuit that converts a direct-current voltage smoothed by the capacitor into an alternating-current voltage and supplies electric power to a load;
a current sensor that detects current that is output by the capacitor and is input directly to the inverter circuit without passing through any other component;
a frequency detector that detects a frequency of a frequency component having a maximum amplitude among frequency components of the current flowing from the capacitor to the inverter circuit, based on a detection result of the current sensor;
a phase detector that detects a phase of the frequency component having the maximum amplitude among the frequency components of the current flowing from the capacitor to the inverter circuit, and detects a time when each amplitude of the frequency component having the maximum amplitude is zero, based on the detection result of the current sensor;
a carrier oscillator that generates a pulse width modulation carrier signal;
a carrier signal controller that controls frequency and phase of the pulse width modulation carrier signal generated by the carrier oscillator, and causes the carrier oscillator to generate a corrected pulse width modulation carrier signal by controlling the frequency and the phase of the pulse width modulation carrier signal generated by the carrier oscillator, based on a detection result of the frequency detector and a detection result of the phase detector, the corrected carrier signal having a frequency that matches the frequency detected by the frequency detector and a rise time synchronized to the time detected by the phase detector; and
a gate drive circuit that generates the converter gate signal based on the corrected phase-modulated carrier signal, and inputs the converter gate signal to the switch of the converter circuit to control switching of the switch of the converter circuit,
wherein the convertor circuit transforms the input power supply voltage to the transformed output voltage due to the convertor gate signal switching of the switch of the converter circuit.

2. The power converter of claim 1, wherein
the current sensor is disposed between the capacitor and the inverter circuit so as to be electrically connected to the capacitor and the inverter circuit, the frequency detector detects the frequency of the frequency component having the maximum amplitude by performing a frequency analysis on a waveform of the current in a time direction detected by the current sensor, and the phase detector detects the time when each amplitude of the frequency component having the maximum amplitude is zero based on the waveform of the current.

3. The power converter of claim 1, wherein the current sensor is disposed between the inverter circuit and the load so as to be electrically connected to the inverter circuit and the load, the frequency detector stores frequencies of resonant current flowing through the load in correspondence with expected frequencies that are frequencies of the frequency component having the maximum amplitude among frequency components of current flowing through the inverter circuit, and selects one of the expected frequencies, which corresponds with a frequency of the resonant current detected by the current sensor, the phase detector detects the time when each amplitude of the frequency component having the maximum amplitude is zero based on a waveform of the resonant current detected by the current sensor, and the corrected carrier signal has a frequency that matches the expected frequency selected by the frequency detector.

4. The power converter of claim 1, wherein the current sensor is disposed between the inverter circuit and the load so as to be electrically connected to the inverter circuit and the load, the current sensor further comprises a calculator that calculates a waveform of current flowing through the inverter circuit, based on a waveform of the current detected by the current sensor, the frequency detector detects the frequency of the frequency component having the maximum amplitude by performing a frequency analysis on the waveform calculated by the calculator in a time direction, and the phase detector detects the time when each amplitude of the frequency component having the maximum amplitude is zero based on the waveform calculated by the calculator.

5. The power converter of claim 1, wherein the carrier oscillator generates the pulse width modulation carrier signal with a sawtooth wave.

* * * * *